United States Patent
Zheng et al.

(10) Patent No.: US 11,254,776 B2
(45) Date of Patent: Feb. 22, 2022

(54) EARLY-STRENGTH POLYCARBOXYLATE SUPERPLASTICIZER WITH MOF STRUCTURE AND PREPARATION METHOD THEREOF

(71) Applicant: Jiangsu ARIT New Materials CO., LTD., Nanjing (CN)

(72) Inventors: Chunyang Zheng, Nanjing (CN); Shanshan Qian, Nanjing (CN); Haidong Jiang, Nanjing (CN); Chunman Huang, Nanjing (CN); Jiezhong Gan, Nanjing (CN); Yangcheng Hu, Nanjing (CN)

(73) Assignee: JIANGSU ARIT NEW MATERIALS CO., LTD., Nanjing (CN)

( * ) Notice: Subject to any disclaimer, the term of this patent is extended or adjusted under 35 U.S.C. 154(b) by 0 days.

(21) Appl. No.: 17/120,280

(22) Filed: Dec. 14, 2020

(65) Prior Publication Data

US 2022/0002465 A1  Jan. 6, 2022

(30) Foreign Application Priority Data

Jul. 6, 2020 (CN) .......................... 202010644063.6

(51) Int. Cl.
| | |
|---|---|
| C04B 24/26 | (2006.01) |
| C08F 293/00 | (2006.01) |
| C04B 24/40 | (2006.01) |
| C04B 103/32 | (2006.01) |

(52) U.S. Cl.
CPC ........ *C08F 293/005* (2013.01); *C04B 24/405* (2013.01); *C04B 2103/32* (2013.01); *C08F 2438/01* (2013.01)

(58) Field of Classification Search
CPC ............... C04B 24/405; C04B 2103/32; C08F 293/005; C08F 2438/01
See application file for complete search history.

(56) References Cited

U.S. PATENT DOCUMENTS

| | | | | |
|---|---|---|---|---|
| 2017/0128381 | A1* | 5/2017 | Kumar | ................... B01J 13/203 |
| 2017/0202781 | A1* | 7/2017 | Rannard | ............. A61K 9/5192 |
| 2019/0276607 | A1* | 9/2019 | Kim | ........................ C08G 65/34 |

FOREIGN PATENT DOCUMENTS

CN    110156942 A  *  8/2019

OTHER PUBLICATIONS

The machine translation into English of CN 110156942 A; Huang et al; Aug. 2019. (Year: 2019).*

* cited by examiner

*Primary Examiner* — Karuna P Reddy
(74) *Attorney, Agent, or Firm* — Bayramoglu Law Offices LLC

(57) ABSTRACT

An early-strength polycarboxylate superplasticizer with an MOF structure and a preparation method thereof are provided. The preparation method includes the following steps: 1) performing an amidation reaction on amine-containing nanocrystalline MOFs and a halogen acyl halide organic molecule to form the halogen-containing ATRP initiator; 2) performing an ATRP reaction on the obtained ATRP initiator, an unsaturated ester monomer, an unsaturated polyether macromonomer and a transition metal complex to obtain the early-strength polycarboxylate superplasticizer with the MOF structure. The present invention regulates the number and length of branch chains and product performance by controlling the number of amine groups contained in the nanocrystalline MOFs and ATRP, and has the advantages of rapid reaction, high efficiency, non-toxic and non-pollution, and simple operation. The prepared early-strength polycarboxylate superplasticizer with the MOF structure has early-strength performance and stable product performance.

8 Claims, No Drawings

EARLY-STRENGTH POLYCARBOXYLATE SUPERPLASTICIZER WITH MOF STRUCTURE AND PREPARATION METHOD THEREOF

CROSS REFERENCE TO THE RELATED APPLICATIONS

This application is based upon and claims priority to Chinese Patent Application No. 202010644063.6, filed on Jul. 6, 2020, the entire contents of which are incorporated herein by reference.

TECHNICAL FIELD

The present invention relates to the technical field of polycarboxylate superplasticizers for cement concrete, and in particular, to a polycarboxylate superplasticizer with a metal-organic framework (MOF) structure prepared by an amidation reaction and an atom transfer radical polymerization (ATRP) and a preparation method thereof.

BACKGROUND

Metal-organic frameworks (MOFs) are a new kind of porous materials with infinite network structure, which is formed by rigid organic ligands bridging metal ions or metal clusters via coordination bonds. Currently, MOFs have attracted extensive attention from domestic and foreign researchers. MOFs are widely used in the fields of gas adsorption and storage, catalysis, photoelectric materials, sensing, and medical diagnosis because they possess the following advantages. MOFs enable easy accessibility to raw materials, high porosity, high specific surface area, adjustable morphology and size, rich and diverse structures, and can be prepared by various simple synthesis strategies and used for various chemical modifications according to the experimental requirements.

Polycarboxylate superplasticizers have a comb-type molecular structure, and have the advantages of good adaptability with cementitious materials, low dosage, free pollution, low cost, high water-reducing ratio, excellent slump retention, controllable setting time, low shrinkage, good appearance quality of concrete, low alkali content and low chloride ion content. MOFs generally provide significantly high porosity, and therefore provide enough space for the addition of functional groups, which makes MOFs a potential candidate for surface modification.

SUMMARY

The objective of the present invention is to provide an early-strength polycarboxylate superplasticizer with a metal-organic framework (MOF) structure and a preparation method thereof, in order to overcome the shortcomings existing in the prior art.

In order to achieve the above objective, the present invention adopts the following technical solutions.

The present invention provides an early-strength polycarboxylate superplasticizer with an MOF structure, having a structural formula as follows:

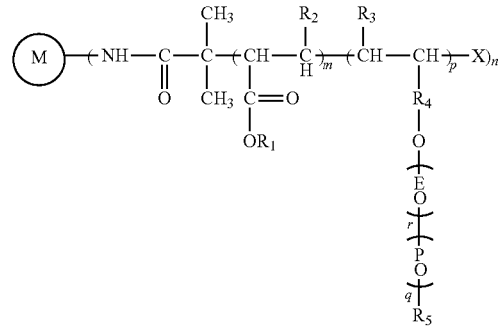

where, $R_1$, $R_2$, $R_3$ and $R_5$ each are at least one selected from the group consisting of hydrogen, an aliphatic group, an alicyclic group and an aromatic group; $R_4$ is at least one selected from the group consisting of the aliphatic group, the alicyclic group and the aromatic group; X is a halogen; degrees of polymerization r and q are each independently 9-200, degrees of polymerization m and p are each independently 10-100; $n \geq 1$.

As a preferred solution of the early-strength polycarboxylate superplasticizer with the MOF structure of the present invention, a weight-average molecular weight of the early-strength polycarboxylate superplasticizer with the MOF structure is 20,000-80,000 g/mol.

The present invention further provides a preparation method of the early-strength polycarboxylate superplasticizer with the MOF structure, including the following steps:

1) preparation of an atom transfer radical polymerization (ATRP) initiator: performing an amidation reaction on amine-containing nanocrystalline MOFs and a halogen acyl halide organic molecule at 0-25° C. for 30-90 min, to form a halogen-containing ATRP initiator; wherein a molar ratio of the amine-containing nanocrystalline MOFs to the halogen acyl halide organic molecule is 1:(1-5);

2) preparation of the early-strength polycarboxylate superplasticizer with the MOF structure: performing an ATRP reaction on the ATRP initiator prepared in step 1), an unsaturated ester monomer, an unsaturated polyether macromonomer and a transition metal complex at 60-80° C. for 30-90 min, to obtain the early-strength polycarboxylate superplasticizer with the MOF structure; wherein a molar ratio of the ATRP initiator, the unsaturated ester monomer, the unsaturated polyether macromonomer and the transition metal complex is 1:(0.3-6):(0.1-1):(0.001-0.01).

As a preferred solution of the preparation method of the present invention, a structural formula of the amine-containing nanocrystalline MOFs in step 1) is:

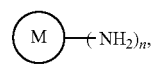

where M is a metal ion, $n \geq 1$, and the metal ion is preferably one or a combination of aluminum, magnesium, copper, gold, zinc, iron and a rare earth metal.

As a preferred solution of the preparation method of the present invention, a structural formula of the halogen acyl halide organic molecule in step 1) is:

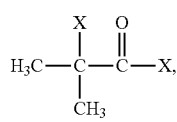

where X is bromine or chlorine. The halogen acyl halide organic molecule is more preferably one or a combination of 2-bromoisobutyryl bromide, 2-bromoisobutyryl chloride, 2-chloroisobutyryl chloride, 2-chloropropionyl chloride and 2-bromopropionyl chloride.

As a preferred solution of the preparation method of the present invention, a structural formula of the unsaturated ester monomer in step 2) is:

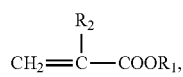

where $R_2$ is hydrogen or an alkyl group with 1-6 carbon atoms, and $R_1$ is an alkyl group or a hydroxyl alkane with 1-8 carbon atoms. The unsaturated ester monomer is more preferred one or a combination of methyl acrylate, ethyl acrylate, propyl acrylate, butyl acrylate, methyl methacrylate, ethyl methacrylate, butyl methacrylate, octyl acrylate, hydroxymethyl acrylate, hydroxyethyl acrylate, hydroxypropyl acrylate and hydroxybutyl methacrylate.

As a preferred solution of the preparation method of the present invention, the unsaturated polyether macromonomer in step 2) is one or a combination of allyl polyethylene glycol, methylallyl polyethylene glycol, 3-methyl-3-butene-1-polyethylene glycol, 2-methylallyl polyethylene glycol, methoxy polyethylene glycol methacrylate, methoxy polyethylene glycol acrylate, polyethylene glycol acrylic acid monoester and polyethylene glycol methacrylate. A weight-average molecular weight of the unsaturated polyether macromonomer is 300-8,000 g/mol.

As a preferred solution of the preparation method of the present invention, the transition metal complex in step 2) is prepared by a metal halide and a ligand in a molar ratio of 1:(1-2). The transition metal complex is more preferably one or a combination of CuBr/pentamethyldiethylenetriamine (PMDETA), CuCl/hexamethyltriethylenetetramine (HMTETA), CuBr/N,N,N',N'-tetrakis(2-pyridylmethyl)ethylenediamine (TPEN), CuBr/tri[2-(dimethylamine) ethyl] amine (Me6TREN), CuCl/PMDETA, CuBr/HMTETA, CuCl/TPEN and CuCl/Me6TREN.

The advantages of the present invention are as follows:
1. The raw materials used in the present invention have rich resources.
2. The present invention synthesizes a sea urchin-like polycarboxylate superplasticizer through ATRP of nanocrystalline MOFs containing different amounts of amine groups, which provides a new synthesis idea of polycarboxylate superplasticizers and synthesizes a new molecular structure of superplasticizers. The polycarboxylate superplasticizer has the advantages of high water-reducing ratio, excellent concrete retention performance, rapid reaction, non-toxic and non-pollution, and simple operation.
3. The polycarboxylate superplasticizer product prepared by the present invention has early-strength performance without affecting water reducing effect.
4. The preparation method of the present invention has the advantages of being safe and reliable, requiring simple and convenient operation steps, producing no toxic substance or pollutants and being environmentally friendly safety in the whole process of preparing the polycarboxylate superplasticizer product.
5. The present invention can adjust the molecular structure of the product by controlling the amidation reaction and ATRP, thus obtaining excellent performance. The research and development of the polycarboxylate superplasticizer with an MOF structure is making a breakthrough of traditional water-reducing agent technology. The designability of molecular structure determines that a series of chemicals with better performance can be developed with different properties or new structures, which can meet the diversified requirements of concrete admixtures in construction engineering. It is certain that the polycarboxylate superplasticizer of the present invention will have broad development potential and market prospect.
6. The polycarboxylate superplasticizer product prepared by the method of the present invention, after being prepared into an aqueous solution, is stable without layering or precipitation during storage.

DETAILED DESCRIPTION OF THE EMBODIMENTS

In order to make the technical objective, technical solutions and advantages of the present invention clearer, the present invention will be further described in combination with various embodiments.

Embodiment 1

1) Preparation of an ATRP initiator: 1 mol of nanocrystalline iron-organic frameworks containing one amine group and 1 mol of 2-bromoisobutyryl bromide are subjected to an amidation reaction at 0° C. for 90 min, to form a halogen-containing ATRP initiator.

2) Preparation of a polycarboxylate superplasticizer with an MOF structure: 1 mol of the ATRP initiator prepared in step 1), 6 mol of methyl acrylate, 0.1 mol of methylallyl polyethylene glycol (300 g/mol) and 0.01 mol of CuBr/PMDETA are subjected to a reaction at 60° C. for 90 min, and then water is added to obtain a 60 wt % polycarboxylate superplasticizer with the MOF structure having a weight-average molecular weight of 20,000 g/mol.

The molecular structure of the polycarboxylate superplasticizer is as follows:

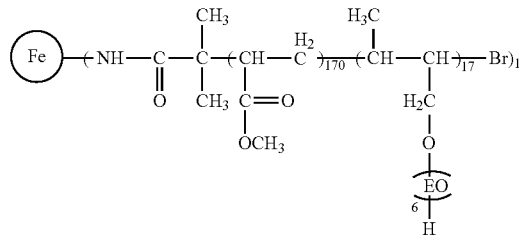

Embodiment 2

1) Preparation of an ATRP initiator: 1 mol of nanocrystalline magnesium-organic frameworks containing two amine groups and 2 mol of 2-bromoisobutyryl chloride are subjected to an amidation reaction at 25° C. for 30 min, to form a halogen-containing ATRP initiator.

2) Preparation of a polycarboxylate superplasticizer with an MOF structure: 1 mol of the ATRP initiator prepared in step 1), 5 mol of ethyl acrylate, 1 mol of 3-methyl-3-butene-1-polyethylene glycol (800 g/mol) and 0.001 mol of CuBr/TPEN are subjected to a reaction at 70° C. for 30 min, and then water is added to obtain a 5-60 wt % polycarboxylate superplasticizer with the MOF structure having a weight-average molecular weight of 30,000 g/mol.

The molecular structure of the polycarboxylate superplasticizer is as follows:

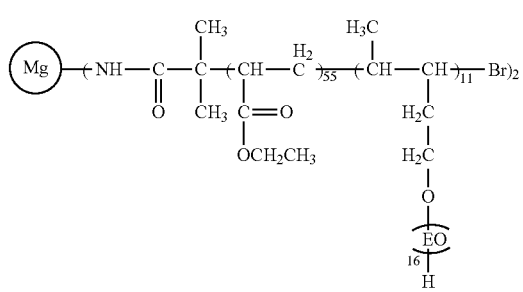

Embodiment 3

1) Preparation of an ATRP initiator: 1 mol of nanocrystalline aluminum-organic frameworks containing three amine groups and 3 mol of 2-chloroisobutyryl chloride are subjected to an amidation reaction at 20° C. for 70 min, to form a halogen-containing ATRP initiator.

2) Preparation of a polycarboxylate superplasticizer with an MOF structure: 1 mol of the ATRP initiator prepared in step 1), 0.3 mol of propyl acrylate, 0.3 mol of 3-methyl-3-butene-1-polyethylene glycol (800 g/mol) and 0.002 mol of CuBr/TPEN are subjected to a reaction at 80° C. for 40 min, and then water is added to obtain a 50 wt % polycarboxylate superplasticizer with the MOF structure having a weight-average molecular weight of 50,000 g/mol.

The molecular structure of the polycarboxylate superplasticizer is as follows:

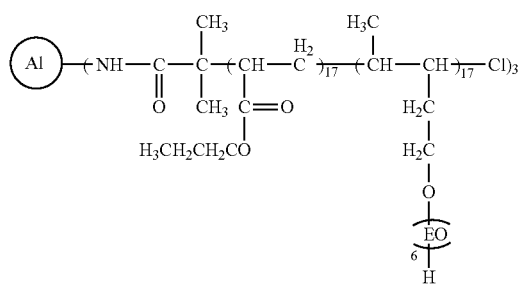

Embodiment 4

1) Preparation of an ATRP initiator: 1 mol of nanocrystalline zinc-organic frameworks containing four amine groups and 4 mol of 2-bromopropionyl chloride are subjected to an amidation reaction at 5° C. for 30 min, to form a halogen-containing ATRP initiator.

2) Preparation of a polycarboxylate superplasticizer with an MOF structure: 1 mol of the ATRP initiator prepared in step 1), 2 mol of methyl methacrylate, 1 mol of methoxy polyethylene glycol monomethyl ether(methyl)acrylate (1,000 g/mol) and 0.004 mol of CuCl/PMDETA are subjected to a reaction at 80° C. for 50 min, and then water is added to obtain a 50 wt % polycarboxylate superplasticizer with the MOF structure having a weight-average molecular weight of 60,000 g/mol.

The molecular structure of the polycarboxylate superplasticizer is as follows:

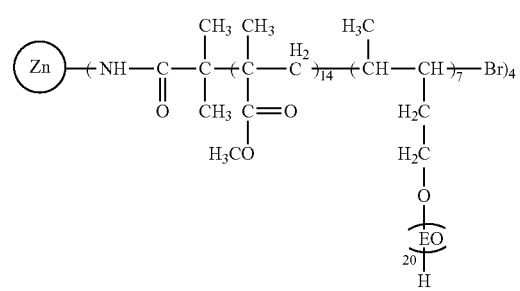

Embodiment 5

1) Preparation of an ATRP initiator: 1 mol of nanocrystalline copper-organic frameworks containing two amine groups and 2 mol of 2-bromoisobutyryl bromide are subjected to an amidation reaction at 10° C. for 90 min, to form a halogen-containing ATRP initiator.

2) Preparation of a polycarboxylate superplasticizer with an MOF structure: 1 mol of the ATRP initiator prepared in step 1), 3 mol of butyl acrylate, 0.5 mol of 2-methylallyl polyethylene glycol (2,000 g/mol) and 0.003 mol of CuBr/Me6TREN are subjected to a reaction at 75° C. for 80 min, and then water is added to obtain a 60 wt % polycarboxylate superplasticizer with the MOF structure having a weight-average molecular weight of 60,000 g/mol.

The molecular structure of the polycarboxylate superplasticizer is as follows:

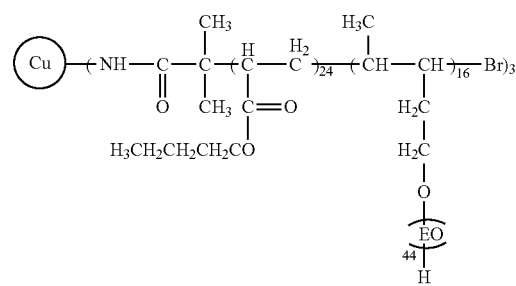

Embodiment 6

1) Preparation of an ATRP initiator: 1 mol of nanocrystalline gold-organic frameworks containing five amine groups and 3 mol of 2-chloroisobutyryl chloride are subjected to an amidation reaction at 15° C. for 80 min, to form a halogen-containing ATRP initiator.

2) Preparation of a polycarboxylate superplasticizer with an MOF structure: 1 mol of the ATRP initiator prepared in step 1), 4 mol of ethyl methacrylate, 1 mol of polyethylene glycol acrylate (1,200 g/mol) and 0.005 mol of CuBr/HMTETA are subjected to a reaction at 65° C. for 70 min, and then water is added to obtain a 40 wt % polycarboxylate superplasticizer with the MOF structure having a weight-average molecular weight of 80,000 g/mol.

The molecular structure of the polycarboxylate superplasticizer is as follows:

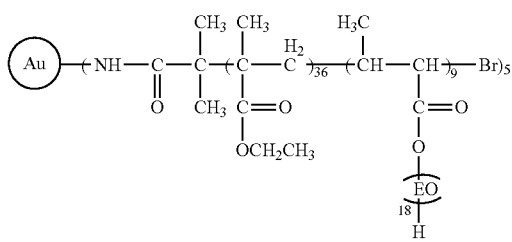

Embodiment 7

1) Preparation of an ATRP initiator: 1 mol of nanocrystalline chromium-organic frameworks containing four amine groups and 4 mol of 2-chloropropionyl chloride are subjected to an amidation reaction at 25° C. for 60 min, to form a halogen-containing ATRP initiator.

2) Preparation of a polycarboxylate superplasticizer with an MOF structure: 1 mol of the ATRP initiator prepared in step 1), 5 mol of butyl methacrylate, 1 mol of methoxy polyethylene glycol acrylate (2,400 g/mol) and 0.006 mol of CuCl/TPEN are subjected to a reaction at 75° C. for 90 min, and then water is added to obtain a 30 wt % polycarboxylate superplasticizer with the MOF structure having a weight-average molecular weight of 45,000 g/mol.

The molecular structure of the polycarboxylate superplasticizer is as follows:

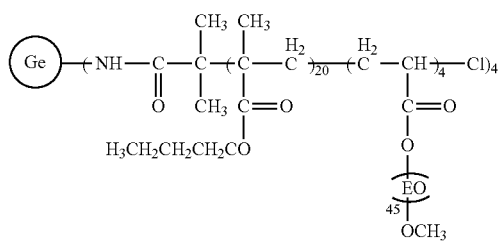

Embodiment 8

1) Preparation of an ATRP initiator: 1 mol of nanocrystalline zirconium-organic frameworks containing three amine groups and 5 mol of 2-bromopropionyl chloride are subjected to an amidation reaction at 0° C. for 40 min, to form a halogen-containing ATRP initiator.

2) Preparation of a polycarboxylate superplasticizer with an MOF structure: 1 mol of the ATRP initiator prepared in step 1), 6 mol of hydroxybutyl methacrylate, 1 mol of polyethylene glycol methacrylate (3,000 g/mol) and 0.007 mol of CuCl/Me6TREN are subjected to a reaction at 80° C. for 50 min, and then water is added to obtain a 20 wt % polycarboxylate superplasticizer with the MOF structure having a weight-average molecular weight of 60,000 g/mol.

The molecular structure of the polycarboxylate superplasticizer is as follows:

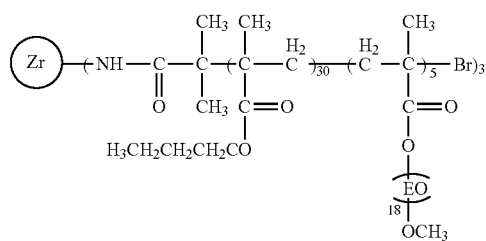

Test Example

1. Cement Paste Fluidity Test

A cement paste fluidity test is performed respectively on the samples obtained from embodiments 1-8 according to GB 8077-2000 Methods for Testing Uniformity of Concrete Admixture. The results are shown in Table 1. The water-cement ratio (W/C) is 0.29, and the dosage (solid content) of admixture is 0.10% of the amount of cement.

There is no significant loss of cement paste fluidity within 1 h.

TABLE 1

Cement paste fluidity and gradual loss of different samples

| Sample | Dosage | Cement paste fluidity/mm | |
|---|---|---|---|
| | | 0 h | 1 h |
| 1 | 0.10% | 206 | 203 |
| 2 | | 208 | 201 |
| 3 | | 216 | 212 |
| 4 | | 205 | 205 |
| 5 | | 219 | 209 |
| 6 | | 207 | 204 |
| 7 | | 217 | 212 |
| 8 | | 226 | 213 |

2. Concrete Performance Test

Tests including slump loss and concrete early-strength are performed on the samples obtained from embodiments 1-8 according to GB8076-2008 Concrete Admixtures. Ordinary polycarboxylate superplasticizer is set as a blank sample. The results are shown in Table 2. When the dosage (solid content) of admixture is 1.2% (relative to the amount of cement), the water-reducing ratios are all higher than 40%, the compressive strengths measured at 1st day are all increased by more than 92%, and the compressive strengths measured at 3rd day are all increased by more than 60%.

TABLE 2

Concrete slump retention and early mechanical performance of different samples

| sample | Dosage | Slump (mm)/expansion degree (mm) | | Compressive strength/MPa | | |
|---|---|---|---|---|---|---|
| | | 0 h | 1 h | 1 d | 3 d | 7 d |
| Blank sample | 1.2% | 200/455 | — | 16.7 | 21.6 | 42.1 |
| 1 | | 210/515 | 180/455 | 28.2 | 34.6 | 44.5 |
| 2 | | 205/510 | 185/465 | 29.1 | 35.5 | 45.3 |
| 3 | | 205/515 | 180/455 | 28.2 | 35.6 | 46.2 |

TABLE 2-continued

Concrete slump retention and early mechanical performance of different samples

| sample | Dosage | Slump (mm)/expansion degree (mm) | | Compressive strength/MPa | | |
|---|---|---|---|---|---|---|
| | | 0 h | 1 h | 1 d | 3 d | 7 d |
| 4 | | 205/510 | 180/445 | 29.4 | 36.8 | 45.1 |
| 5 | | 210/515 | 190/465 | 29.4 | 39.5 | 46.7 |
| 6 | | 210/520 | 195/475 | 28.1 | 38.3 | 45.8 |
| 7 | | 205/510 | 185/455 | 27.1 | 37.4 | 44.9 |
| 8 | | 210/510 | 200/470 | 26.1 | 36.7 | 45.6 |

Obviously, the above described embodiments are only a part of the preferred embodiments of the present invention, not all of them. Based on the embodiments of the present invention, modifications, replacements and improvements made by a person skilled in the art without creative labor shall fall within the scope of protection of the present invention.

What is claimed is:

1. A preparation method of an early-strength polycarboxylate superplasticizer with a MOF structure, comprising the following steps:
   1) preparation of a halogen-containing atom transfer radical polymerization (ATRP) initiator: performing an amidation reaction on amine-containing nanocrystalline MOFs and a halogen acyl halide organic molecule at 0-25° C. for 30-90 min, to form the halogen-containing ATRP initiator; wherein a molar ratio of the amine-containing nanocrystalline MOFs to the halogen acyl halide organic molecule is 1: (1-5);
   2) preparation of the early-strength polycarboxylate superplasticizer with the MOF structure: performing an ATRP reaction on the halogen-containing ATRP initiator prepared in step 1), an unsaturated ester monomer, an unsaturated polyether macromonomer and a transition metal complex at 60-80° C. for 30-90 min, to obtain the early-strength polycarboxylate superplasticizer with the MOF structure; wherein a molar ratio of the halogen-containing ATRP initiator, the unsaturated ester monomer, the unsaturated polyether macromonomer and the transition metal complex is 1: (0.3-6): (0.1-1): (0.001-0.01).

2. The preparation method according to claim 1, wherein a structural formula of the amine-containing nanocrystalline MOFs in step 1) is:

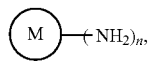

wherein, M is a metal ion, n≥1, and the metal ion is at least one selected from the group consisting of aluminum, magnesium, copper, gold, zinc, iron and a rare earth metal.

3. The preparation method according to claim 1, wherein a structural formula of the halogen acyl halide organic molecule in step 1) is:

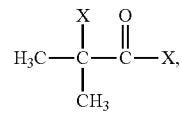

wherein X is bromine or chlorine.

4. The preparation method according to claim 1, wherein, the halogen acyl halide organic molecule is at least one selected from the group consisting of 2-bromoisobutyryl bromide, 2-bromoisobutyryl chloride, 2-chloroisobutyryl chloride, 2-chloropropionyl chloride and 2-bromopropionyl chloride.

5. The preparation method according to claim 1, wherein a structural formula of the unsaturated ester monomer in step 2) is:

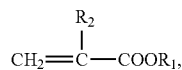

wherein, $R_2$ is hydrogen or an alkyl group with 1-6 carbon atoms, and $R_1$ is an alkyl group with 1-8 carbon atoms or a hydroxyl alkane with 1-8 carbon atoms.

6. The preparation method according to claim 1, wherein, the unsaturated ester monomer is at least one selected from the group consisting of methyl acrylate, ethyl acrylate, propyl acrylate, butyl acrylate, methyl methacrylate, ethyl methacrylate, butyl methacrylate, octyl acrylate, hydroxymethyl acrylate, hydroxyethyl acrylate, hydroxypropyl acrylate and hydroxybutyl methacrylate.

7. The preparation method according to claim 1, wherein, the unsaturated polyether macromonomer in step 2) is at least one selected from the group consisting of allyl polyethylene glycol, methylallyl polyethylene glycol, 3-methyl-3-butene-1-polyethylene glycol, 2-methylallyl polyethylene glycol, methoxy polyethylene glycol methacrylate, methoxy polyethylene glycol acrylate, polyethylene glycol acrylic acid monoester and polyethylene glycol methacrylate; a weight-average molecular weight of the unsaturated polyether macromonomer is 300-8,000 g/mol.

8. The preparation method according to claim 1, wherein the transition metal complex in step 2) is at least one selected from the group consisting of CuBr/pentamethyldiethylenetriamine (PMDETA), CuCl/hexamethyltriethylenetetramine (HMTETA), CuBr/N,N,N',N'-tetrakis(2-pyridylmethyl)ethylenediamine (TPEN), CuBr/tri[2-(dimethylamine)ethyl] amine (Me6TREN), CuCl/PMDETA, CuBr/HMTETA, CuCl/TPEN and CuCl/Me6TREN.

* * * * *